(12) United States Patent
Daniel et al.

(10) Patent No.: US 7,395,952 B2
(45) Date of Patent: Jul. 8, 2008

(54) WIRE FEEDING APPARATUS AND METHOD

(75) Inventors: Barton Wade Daniel, Kennesaw, GA (US); Glenn Ellison, Lubbock, TX (US); Scott Shepard, Lubbock, TX (US)

(73) Assignee: L & P Property Management Company, South Gate, CA (US)

( * ) Notice: Subject to any disclaimer, the term of this patent is extended or adjusted under 35 U.S.C. 154(b) by 336 days.

(21) Appl. No.: 10/926,448

(22) Filed: Aug. 25, 2004

(65) Prior Publication Data

US 2006/0043138 A1    Mar. 2, 2006

(51) Int. Cl.
B65H 20/00    (2006.01)
(52) U.S. Cl. .................. 226/185; 226/176; 226/114
(58) Field of Classification Search ............... 226/110, 226/114, 176, 185, 190
See application file for complete search history.

(56) References Cited

U.S. PATENT DOCUMENTS

| | | | | |
|---|---|---|---|---|
| 2,904,168 A * | 9/1959 | Wall et al. ................. 226/176 |
| 3,119,536 A * | 1/1964 | Berkeley ................... 226/110 |
| 3,528,364 A | 9/1970 | Freund ......................... 100/3 |
| 3,720,158 A | 3/1973 | Sauer et al. |
| 3,844,462 A * | 10/1974 | Tarbox et al. ................ 226/25 |
| 4,043,261 A | 8/1977 | Mae ............................ 100/26 |
| 4,354,626 A * | 10/1982 | Brandewie et al. .......... 226/109 |
| 4,461,416 A * | 7/1984 | Cheh .............................. 226/1 |
| 4,488,688 A * | 12/1984 | Trubitsin et al. ............ 242/362.1 |
| 4,561,349 A | 12/1985 | Grenon ....................... 100/26 |
| 4,611,534 A | 9/1986 | Kudlicka et al. ............ 100/26 |
| 4,625,635 A | 12/1986 | Lewis .......................... 100/26 |
| 4,655,379 A * | 4/1987 | Busch ......................... 226/110 |
| 4,842,180 A * | 6/1989 | Kato .......................... 226/176 |
| 5,333,438 A | 8/1994 | Gurak et al. ................. 53/399 |
| 5,379,687 A | 1/1995 | Moseley ........................ 100/3 |
| 5,533,658 A * | 7/1996 | Benedict et al. ............ 226/172 |
| 5,826,499 A | 10/1998 | Bullington ..................... 100/3 |
| 5,890,423 A | 4/1999 | Lih ............................. 100/26 |
| 5,913,469 A * | 6/1999 | Suzuki ........................ 226/36 |
| 6,415,712 B1 | 7/2002 | Helland et al. ............... 100/26 |
| 6,516,592 B1 | 2/2003 | Kimmerle .................... 53/589 |
| 6,553,900 B1 | 4/2003 | Daniel et al. ................. 100/26 |
| 6,571,691 B1 | 6/2003 | Jones .......................... 100/26 |
| 6,637,324 B2 | 10/2003 | Stamps ....................... 100/26 |
| 6,705,214 B1 | 3/2004 | Stamps |
| 6,969,206 B2 * | 11/2005 | Iwanaga et al. ............. 400/618 |
| 2002/0153459 A1 * | 10/2002 | Maurice .................... 248/74.4 |

OTHER PUBLICATIONS

Wikipedia, "servo motor", Jul. 15, 2007.*
Communication Relating to the Results of the Partial International Search dated Jan. 12, 2006.

* cited by examiner

*Primary Examiner*—Evan H Langdon
(74) *Attorney, Agent, or Firm*—Grant D. Kang; Kang Intellectual Property Law, LLC

(57) ABSTRACT

A wire feeding apparatus is disclosed. The wire feeding apparatus includes a rotable drive shaft, a servo motor in driving relationship with the drive shaft and one or more feed modules. Each feed module is selectively engaged with the drive shaft through the use of a linear actuator. When the linear actuator is engaged, each feed module is driven by the drive shaft such that wire is either fed or retracted.

22 Claims, 9 Drawing Sheets

WIRE FEEDING APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates to a wire feeding device for a bulk material baler, and more particularly to a device for feeding wires individually selected from a plurality of wires.

2. Related Art

Wire baling of bulk materials benefits from increased speed and reduced materials cost through automation. Bulk materials include fibrous bulk materials such as cotton and nylon. Fibrous materials are commonly formed into bales by simultaneous compression and binding. There is a continuing need in the automated baling art to improve the efficiency, reliability and accuracy of the bale binding process.

Baling wire performance requirements vary depending upon the bulk material being baled. Such requirements range from industry standard specifications to general operational parameters, such as minimum speeds required for profitability. The Cotton Council issues standard baling constraints specifying particular ranges for the length of wire around the bale and the tension that the wire must withstand.

Current automated baling machines use an articulated track to guide wire around bales of bulk material, while that bale is under compression. Part of the wire guide track in current automated balers must be removable to a second position after the ends of the baling wire have been tied together, in order to allow ejection of the bale and insertion into the baler of the next unit of material for baling. Material to be baled is typically introduced into the automatic baler under vertical compression. Typical pressures for an industry standard 500 pound, 20 by 54 inch bale are in excess of 300 tons. Horizontal plates called follower blocks apply compression through platens which contact the surface of the cotton or other material being compressed. The platens incorporate slots which run laterally to the longitudinal axis of the bale. The Industry Standard number of binding wires for cotton bales is six. Accordingly, there are six slots in the platens. These allow the baling wire to be wrapped around the bale while it is still under compression. The lateral slots have lateral channels behind them for insertion of wire guide tracks in both the upper and lower platens in automatic balers.

It is not uncommon for a wire being looped around the bulk material to bind up in the track or otherwise misfeed. In this case, it is necessary to remove the bound up wire and retie the bale. Presently, there exists no easy or convenient method to re-feed the wire around the bale. Either the wire can be looped manually which presents some hazard to the operator or alternatively the tied wires may be cut and the process begun again. There remains a need for an automatic baling apparatus that can correct mis-feeding errors.

Moreover, in order to loop baling wire around bulk material to be baled, release it from a guide track and knot the ends, tension must be generated in the wire. Likewise, in order to properly knot the ends of the wire, tension must be maintained in the twisting procedure that generates the knot. These tensions must be maintained within prescribed ranges to optimize efficiency and to produce a final bale compliant with industry standards.

Typically, tension is created in the wire by reversing the wire feed mechanism. In other words, the wire feed mechanism reverses, pulling the wire out of the track and drawing it tight against the bail. In the case of a misfeed, it is necessary to not only loop a single wire around the bale, but it is also necessary to tension the wire. There remains a need in the art for a simple but effective apparatus for feeding and tensioning a single wire loop.

U.S. Pat. No. 3,119,536 issued to Berkeley on Jan. 28, 1964 discloses a wire feeding apparatus. The device includes a constantly rotating shaft, a first gear connected to the rotating shaft, and a second gear which is selectively engaged with the first gear. The second gear is mounted on a square bar and is biased upwardly away from the first rotating gear. The Berkeley device uses pivot arms that push the second gear downwardly to overcome the bias and engage with the first gear such that wire is fed. The Berkeley device is relatively complex and expensive due to the number of components it requires. Moreover, the Berkeley device is inefficient in that it utilizes a constantly rotating shaft.

Other prior art devices achieve selective drive of separate wire feed devices by separately powering each of three or more wire feed devices with an individually dedicated servo motor. While this achieves selective engagement of individual wire feeders, it clearly multiplies the expense by using multiple servo motors. There is a need in the art for a device with selective engagability capabilities that is less expensive.

There remains a need in the art for an economical wire feeding apparatus for feeding and tensioning wire that is simple, reliable and inexpensive.

SUMMARY OF THE INVENTION

It is in view of the above problems that the present invention was developed. The invention is a wire feeding apparatus for individually and selectively feeding a plurality of wires with a single motor. The motor rotates a drive shaft. Each wire feeder includes a fixed gear driven by the drive shaft and a pivotable gear that is adapted to move toward and away from the fixed gear. A feed wheel is connected to each gear. As the two gears approach one another and become engaged, the feed wheels frictionally engage a wire, thereby feeding it between them.

In one embodiment, the pivotable gear is mounted on an eccentric and the eccentric is rotated by a linear actuator via a pivotable arm. The linear actuator extends linearly and rotates the eccentric. Rotation of the eccentric causes the pivotable gear to move toward or away from the fixed gear. As such, the linear actuator can be used to selectively control when the wire is fed through each individual wire feeder.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
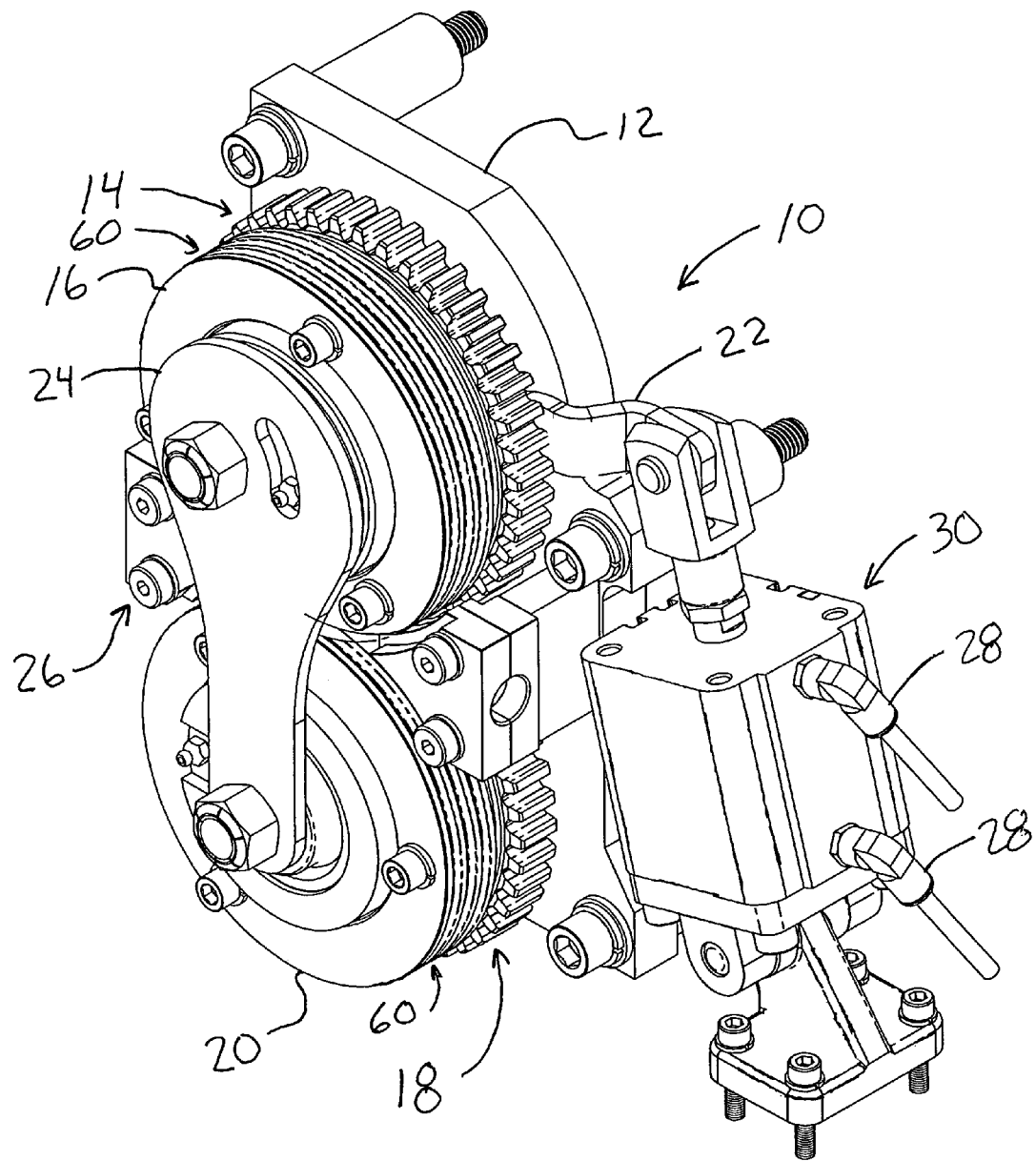
FIG. 1 is a perspective view of the wire feeding apparatus.
Figure 2:
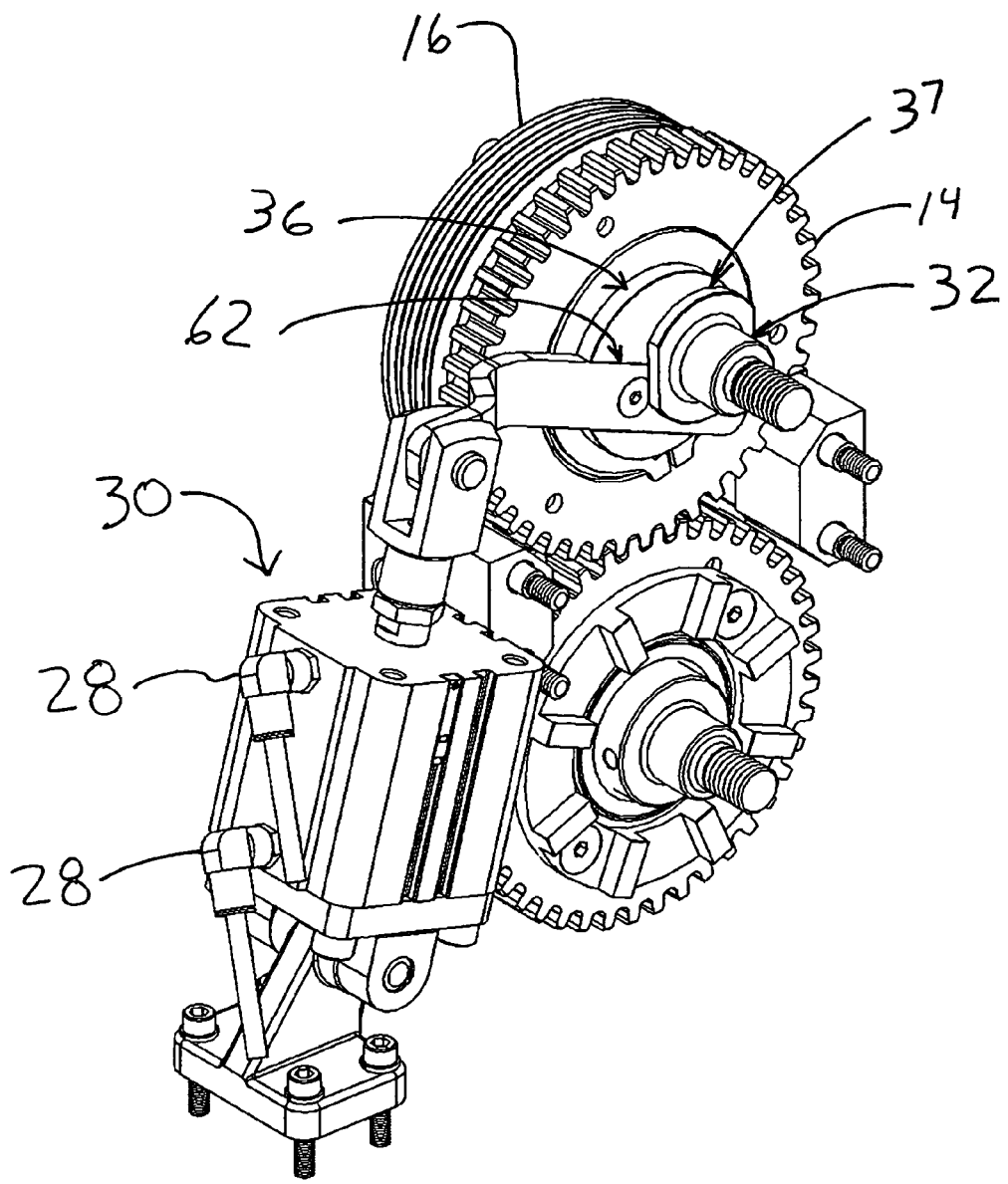
FIG. 2 is a rear perspective view of the wire feeding apparatus.

Referring to the accompanying drawings in which like reference numbers indicate like elements, FIGS. 1 and 2 illustrate a wire feeding apparatus 10. The wire feeding apparatus 10 includes a base plate 12, a first gear 14, a first feed wheel 16, a second gear 18, and a second feed wheel 20. The wire feeding apparatus 10 also includes wire guides 26. The wire guides 26 direct the wire into and away from the feed wheels 16, 20.

The gears 14, 18 have a ratio in the range of about 1:1 to about 2:1. As an example, each gear 14, 18 may have 42 teeth. In the depicted embodiment, the gears 14, 18 are made of crucible steel, and the wheels 16, 20 are made from tool steel. In some embodiments, the wheels 16, 20 are also black oxide coated. The first feed wheel 16 is connected to the first gear 14, and the second feed wheel 20 is connected to the second gear 18.

In the depicted embodiments, each wheel 16, 20 is circumscribed by three grooves 60. Those skilled in the art will understand that a greater or lesser number of grooves may be used. The grooves 60 are dimensioned to accept a particular size of wire. As an example only, the grooves 60 may be dimensioned to accept a 10 gauge wire. The grooves 60 on each wheel 16, 20 are aligned with the grooves on the other wheel.

The first gear 14 is pivotable such that it can be moved toward and away from the second gear 18. As the first gear 14 is pivoted towards the second gear 18, the two gears 14, 18 intermesh such that a wire is captured between the grooves 60 of the feed wheels 16, 20, thereby feeding the wire.

The wire feeding apparatus 10 also includes an eccentric 36, a pivotable arm 22, and a linear actuator 30. As used herein, the term "eccentric" means a component having an eccentric axis of revolution so that the component can impart reciprocating motion. In the depicted embodiment, the eccentric 36 is a cylinder with a hole 37 offset from the center of the cylinder. The hole 37 is adapted to receive a first spindle 32, and the eccentric 36 rotates about first spindle 32 located in the hole 37. In the depicted embodiment, the first gear 14 rotates about the eccentric 36.

The pivotable arm 22 is operatively connected to the first gear 14 such that as the pivotable arm 22 is pivoted, the first gear 14 moves toward or away from the second gear 18. In the depicted embodiment, the eccentric 36 includes a slot 62 that receives the pivotable arm 22 and moves with the pivotable arm 22. As such, when the pivotable arm 22 moves, the eccentric 36 rotates about the first spindle 32.

The linear actuator 30 pivots the pivotable arm 22. In the depicted embodiment, the linear actuator 30 is an air cylinder and includes fittings 28 for receiving a fluid, such as air. However, other types of actuators, a hydraulic cylinder for example, may be used. The linear actuator 30 not only provides a simple mechanism for selectively engaging the feed wheels, but also the linear actuator 30 compensates for wear in the grooves 60 to ensure that the wire is adequately engaged. In other words, as grooves 60 wear out, to a limited extent, the linear actuator 30 decreases the distance between the feed wheels 16, 20. When the linear actuator 30 moves the pivotable arm 22, the pivotable arm 22 rotates the eccentric 36. Thus, actuation of the linear actuator 30 rotates the eccentric 36 and moves the first gear 14 toward or away from the second gear 18.

Figure 3:
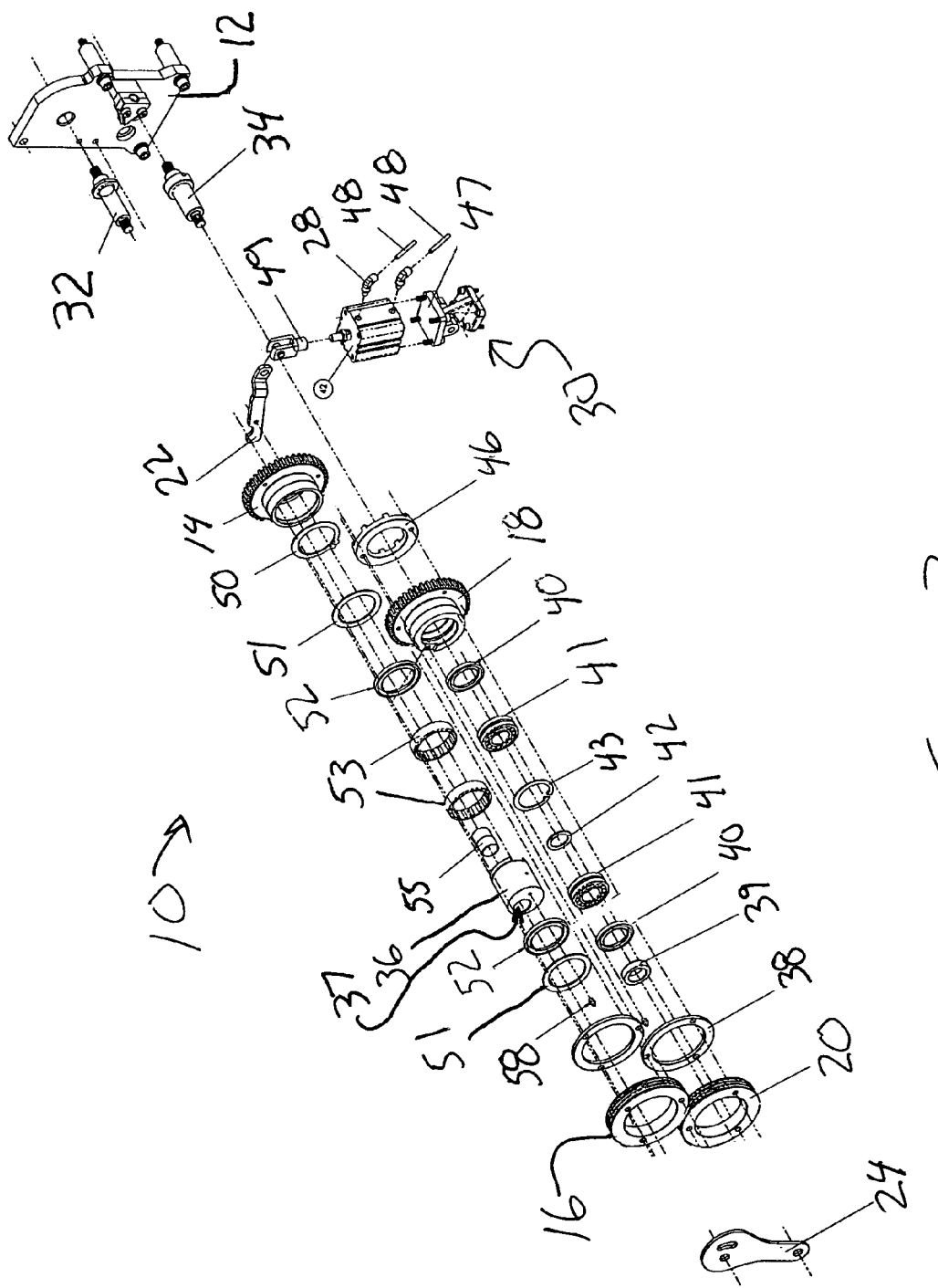
FIG. 3 is an exploded view of the wire feeding apparatus.

FIG. 3 illustrates an exploded view of the wire feeding apparatus 10. The wire feeding apparatus 10 includes a connecting arm 24, the feed wheels 16, 20, a grease fitting 58, an external bearing 39, a thrust washer 51, a first grease seal 40, a spherical roller bearing 41, a second grease seal 52, the eccentric 36, a retaining ring 43, a prelubricated bearing 55, a needle bearing 53, a sensor actuator 46, an external retaining ring 50, the first gear 14, the pivotable arm 22, the linear actuator 30, the first spindle 32, a second spindle 34, and the base plate 12. In some embodiments, the wire feed apparatus 10 also includes a spacer 38. As a groove 60 wears out, the spacer 38 may be inserted between the wheel 16, 20 and the gear 14, 18. For example, if the wheel 16, 20 has two grooves 60 and the first groove wears out, the spacer may be inserted to select the second groove. The connecting arm 24 connects the first spindle 32 to the second spindle 34 thereby providing additional stability.

In the depicted embodiment, the linear actuator 30 includes a front mounting swivel flange 47, tubing 48 connected to the fittings 28, and a rod clevis 49. The front mounting swivel 47 is used to mount the linear actuator 30. The tubing 48 is used to supply fluid, compressed air for example, to the linear actuator 30. The rod clevis 49 is adapted to receive the pivotable arm 22.

The first and second spindles 32, 34 are mounted to the base plate 12. Bearings 41 are mounted on the second spindle 34, and the second gear 18 mounts on the bearings 41. The prelubricated bearing 55 mounts on the first spindle 32, and the eccentric 36 mounts onto the prelubricated bearing 55. In the depicted embodiment, the hole 37 of the eccentric 36 receives the prelubricated bearing 55. The prelubricated bearing 55 mounts onto the first spindle 32, and the eccentric 36 pivots about the first spindle 32.

The first gear 14 is mounted on the eccentric 36. As such, when the eccentric 36 is rotated or pivoted about the first spindle 32, the first gear 14 travels an arcuate path. As assembled, when the eccentric 36 is pivoted about the first spindle 32, the first gear 14 pivots toward or away from the second gear 18. As such, there is a clearance between the first feed wheel 16 and the second feed wheel 20 when the first gear 14 is moved away from the second gear 18. In the depicted embodiment, there is a clearance of 0.140 inches (3.6 mm). The clearance is sufficient to prevent the frictional driving of any wire between the channels 60 of wheels 16, 20.

Figure 4:
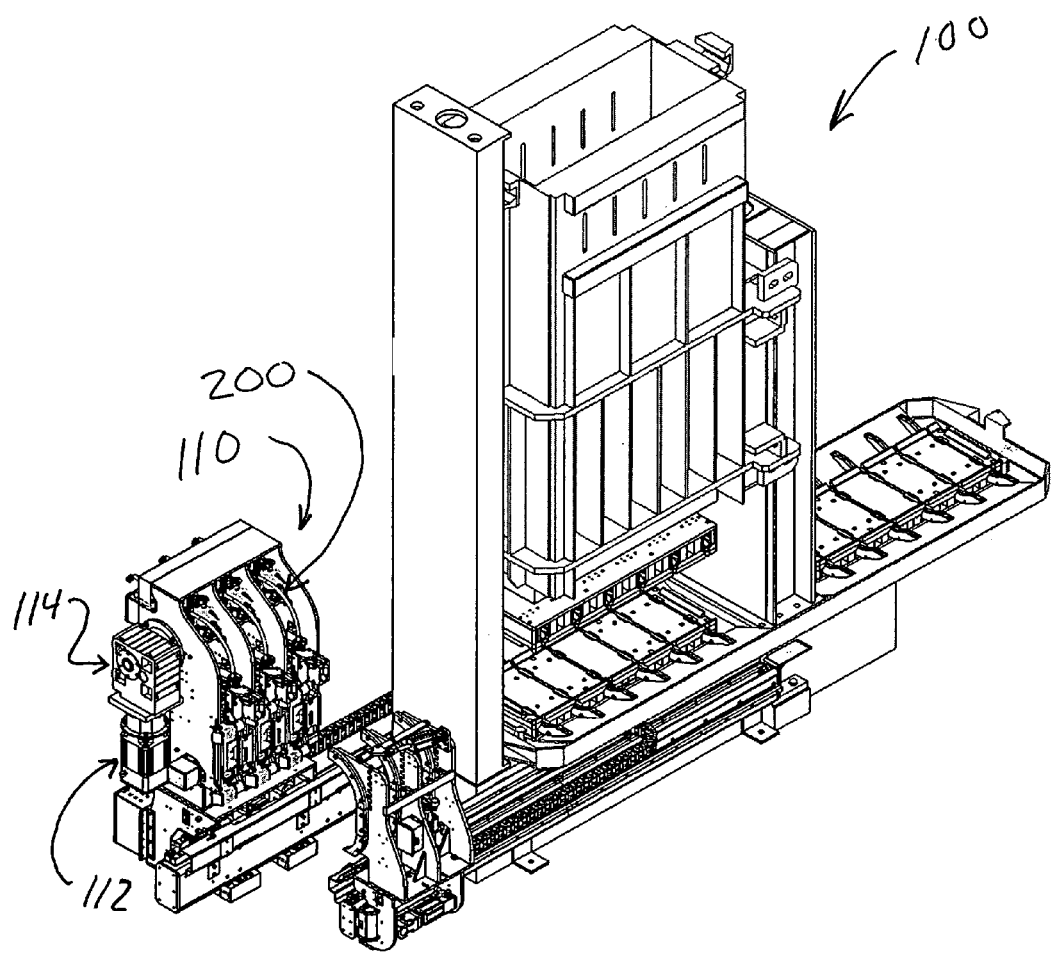
FIG. 4 is a perspective view of a cotton baler.

Referring now the FIG. 4 and as an example only, the wire feeding apparatus 10 may be used within a cotton baling machine deployed in operative cooperation with a cotton press 100. The cotton baling machine includes, among other things, a carriage unit 110. In the depicted embodiment, the carriage unit 110 includes a servo motor 112, a gear box 114, and a plurality of wire feeding apparatus 200.

Figure 5:
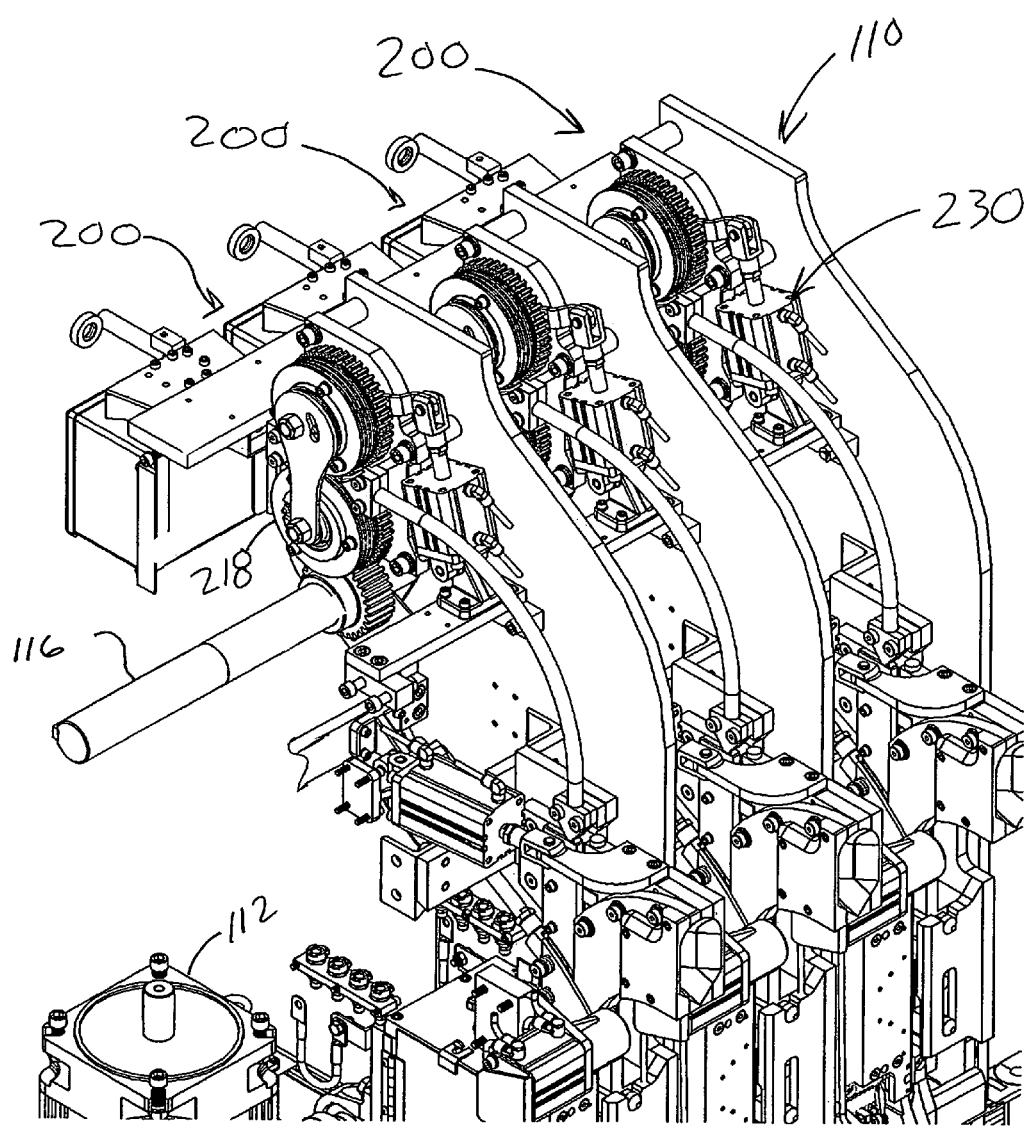
FIG. 5 is a perspective view of the carriage unit.

FIG. 5 illustrates a more detailed view of the carriage unit 110. In FIG. 5, the gear box is omitted for clarity. The carriage unit 110 includes the wire feeding apparatus 200. In the depicted embodiment, there are three wire feeding apparatuses 200. Those skilled in the art will understand that a greater or lesser number of wire feeding apparatus 200 may be used. For example, there may be as few as one feeding apparatus 200 and as many as eight wire feeding apparatuses 200. Each wire feeding apparatus 200 includes a linear actuator 230. The carriage unit 110 also includes the servo motor 112 and a drive shaft 116.

Figure 6:
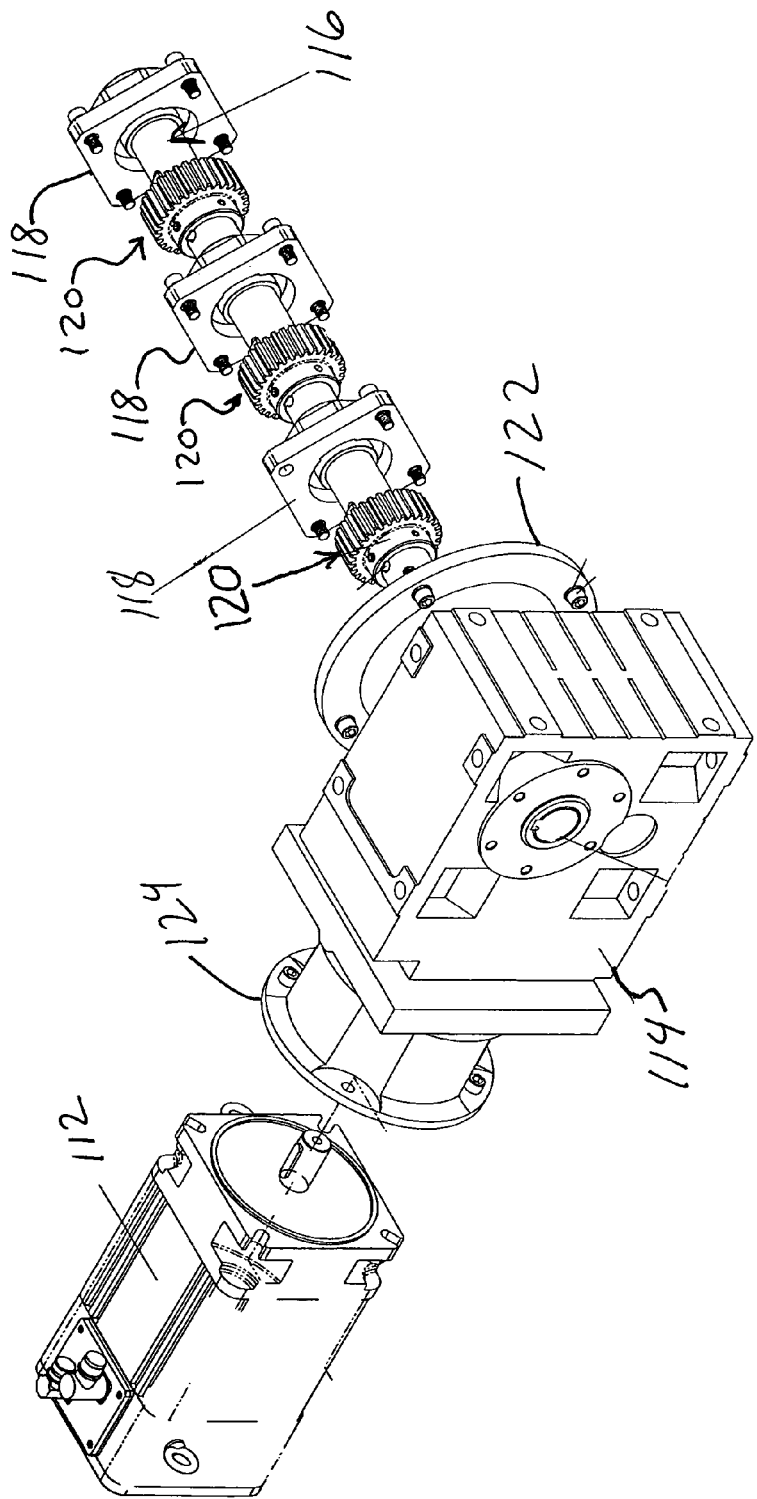
FIG. 6 is an exploded view of a motor drive gear box and drive shaft.

FIG. 6 illustrates the servo motor 112, the gear box 114, and the drive shaft 116. The drive shaft 116 includes spur gears 120 and mounting flanges 118. The mounting flanges 118 support and locate the drive shaft 116. Each spur gear 120 mates with a corresponding second gear 218 (best seen in FIG. 5) and is sized accordingly. In the depicted embodiment, the spur gears 120 each have 24 teeth. The ratio between the second gears 218 and the spur gears 120 is about 1:1 to about 2:1. In the depicted embodiment, the second gears 218 and the spur gears 120 have a ratio of 1.75:1. A first mounting sleeve 124 is used to mount the motor 112 to the gear box 114. A second mounting sleeve 122 is used to mount the gear box to the carriage unit 110. The gearbox 114 is a gear reducer with a gear ratio in the range of about 5:1 to about 7:1. In the depicted embodiment, the gear box 114 has a gear ratio of 5.955:1.

Figure 7:
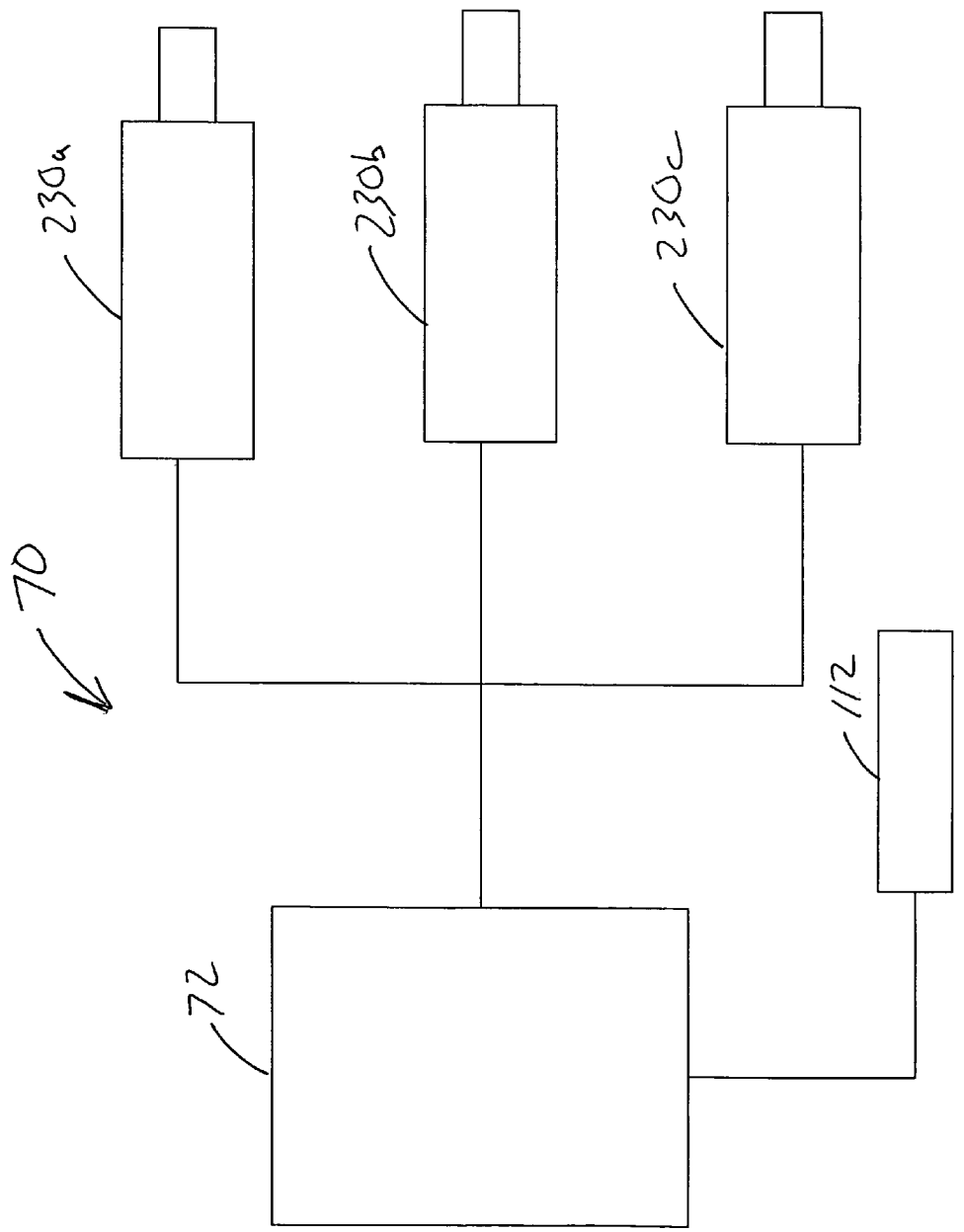
FIG. 7 is a schematic view of a control system.

A control system 70 is illustrated in FIG. 7. The control system 70 includes a control module 72. Components for appropriate control systems 70 are described in U.S. Pat. No. 6,633,798 issued to Stamps et al. on Sep. 30, 2003, which is incorporated herein by reference. They may include, for example, PLCs. The control module 72 is operatively connected to linear actuators 230a, 230b, 230c, and to the servo motor 112. The control module 72 and the linear actuators 230 may be electrically connected such that electrical signals from the control module 72 actuate and de-actuate actuators 230. The control module 72 may receive input directly from an operator or instructions from another machine. The control module 72 selectively engages the linear actuators 230 and the servo motor 112. In one example, the control module 72 engages all three linear actuators 230a, 230b, 230c and subsequently engages the servo motor 112. In another example, the control module 72 engages only one of the linear actuators, such as 230b, and subsequently engages the servo motor 112. In yet another example, the control module 72 engages two of the linear actuators, such as 230a and 230c, and subsequently engages the servo motor 112. In this manner, the wire feeding apparatus 200 can be selectively engaged. For example, if a wire mis-feeds in a particular track, the particular wire feeding apparatus 200 can be singularly engaged to re-feed the wire.

Figure 8:
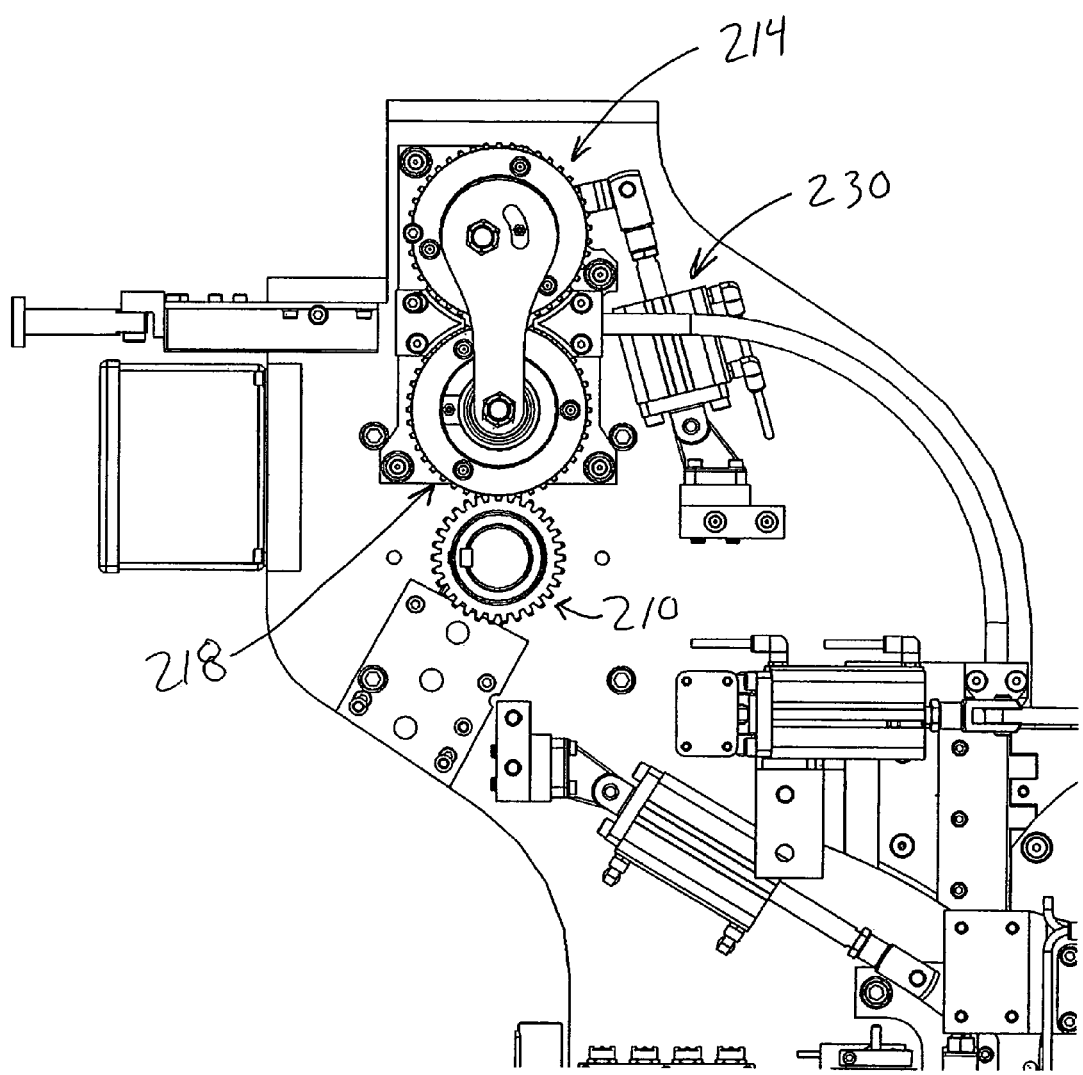
FIG. 8 is a side view of the carriage unit illustrating the linear actuator in a first position.
Figure 9:
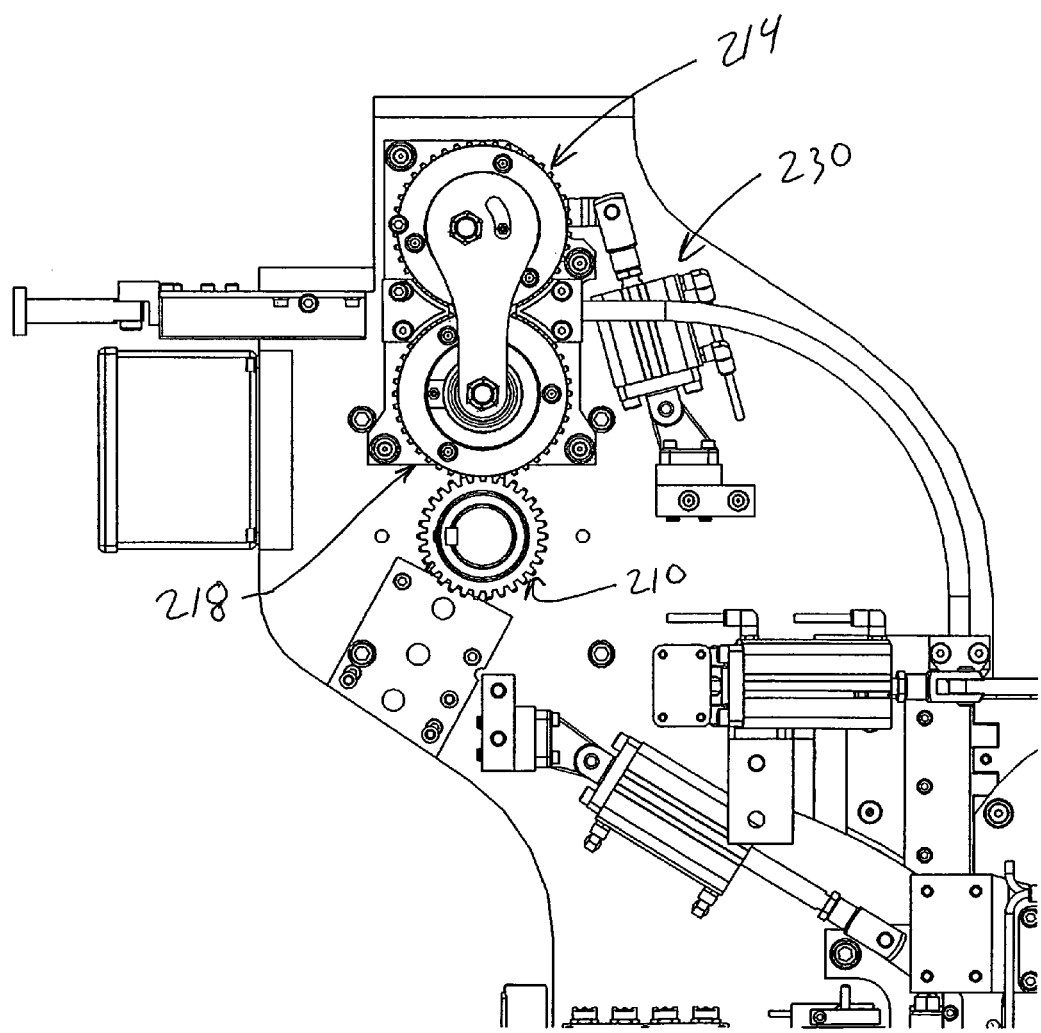
FIG. 9 is a side view of the carriage unit illustrating the linear actuator in a second position.

FIGS. 8 and 9 illustrate operation of the linear solenoid 230. In FIG. 8, the first gear 214 is shown in a first position away from the second gear 218. In the first position, the wire is not fed because there is a clearance between the first gear 214 and the second gear 218. In FIG. 9 however, the linear actuator 230 has moved the first gear 214 to a second position. In this second position, there is very little clearance between the first feeding wheel and the second feeding wheel. As such, the feeding wheels frictionally engage the wire and feed it around the bale.

In FIG. 8, the drive shaft 210 is rotating which in turns rotates the second gear 218. However, because there is a clearance between the first gear 214 and second gear 218, the first gear 214 does not rotate.

In the engaged, driving, second position shown in FIG. 9, the drive shaft 210 rotates, which in turn rotates the second gear 218. Because the first gear 214 is now in contact with the second gear 218, it also rotates. The two gears 214, 218 rotate in opposite directions and pull or push the wire depending upon the rotational direction of the servo motor 112. The drive shaft 210 can be rotated in either direction. As such, the wire can be moved in either direction. This is significant because in the cotton baler 100, wire must first be fed around the bale, but it must then be reversed and pulled back to tension the wire out of its guide tracks and then draw the wire taut against the bale.

A method of assembling a wire feeding apparatus is provided. The method includes the steps of: providing a feed module base plate; connecting a first spindle to the base plate; connecting a second spindle to the base plate; mounting an eccentric on the first spindle; connecting a first gear to the eccentric; connecting a first feed wheel to the first gear; mounting a second gear on the second spindle; connecting a second feed wheel to the second gear; and connecting a pivotable arm to the eccentric. The method further includes the step of connecting an actuator to said pivotable arm. The actuator is deployed to mediate the travel of one of the wheels to and from an engaged position that feeds wire.

There is also provided a method of controlling a wire feeding apparatus. The method includes the steps of: providing a fixed gear connected to a first feed wheel and a pivotable gear connected to a second feed wheel, the pivotable gear mounted for movement toward and away from the fixed gear; providing a pivot arm connected to the pivotable gear and a linear actuator connected to the pivot arm; engaging the linear actuator; moving the pivotable gear toward the fixed gear; frictionally engaging a wire with the first feed wheel and the second feed wheel; engaging a servo motor; and rotating a drive shaft connected to the fixed gear. In some embodiments, the method further includes the step of selecting at least one other linear actuator for engagement.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An individually selectable feed module for a bulk material baler, said feed module comprising:
   a base plate;
   a first spindle mounted on said base plate;
   an eccentric attached to said first spindle;
   a first drive wheel, said first drive wheel having a first gear, said first drive wheel and said first gear being mounted in operative communication with said eccentric such that an axis of rotation of said first drive wheel is pivotally and arcuately movable between a removed position and an engaged position;
   a second spindle mounted on said base plate;

a second drive wheel rotationally mounted on said second spindle, said second drive wheel also having a second gear, said second gear being adapted to receive a rotational drive;

said engaged position disposing said first drive wheel and said second drive wheel in sufficient proximity to frictionally drive a wire therebetween; and an actuator, said actuator being operatively engaged with said eccentric such that activation of the actuator pivots the first drive wheel along an arcuate path between said engaged position and said removed position.

2. The apparatus according to claim 1, further comprising a connecting arm connected to said first spindle and said second spindle.

3. The apparatus according to claim 1, further comprising at least one wire guide.

4. The apparatus according to claim 1, wherein said first feed wheel and said second feed wheel are black oxide coated.

5. The apparatus according to claim 1, wherein said eccentric includes a slot and a pivotable arm located within said slot.

6. The apparatus according to claim 1, wherein said gears remain meshed in said disengaged position.

7. The apparatus according to claim 6, wherein said linear actuator is an air cylinder.

8. The apparatus according to claim 1, further comprising a drive shaft in a driving relationship with said second gear.

9. The apparatus according to claim 8, further comprising a servo motor operatively connected to said drive shaft.

10. The apparatus according to claim 1, wherein said first drive wheel and said second drive each include at least one groove adapted to receive the wire.

11. The apparatus according to claim 10, wherein said groove is dimensioned according to a size of the wire.

12. A wire feeding apparatus comprising:
   a rotatable drive shaft;
   a servo motor in a driving relationship with said rotatable drive shaft, said servo motor adapted to rotate said rotatable drive shaft in a first direction and in a second direction;
   a plurality of feed modules, each of said plurality of feed modules comprising:
      a. a fixed gear in a driven relationship with said drive shaft;
      b. a first feed wheel connected to said fixed gear;
      c. a pivotable gear mounted such that an axis of rotation of said pivoting gear is pivotally movable along an arcuate path toward and away from said fixed gear;
      d. a second feed wheel connected to said pivotable gear;
      e. a pivot arm operatively connected to said pivotable gear; and
   a plurality of linear actuators, each of said plurality of linear actuators connected to each of said pivot arms of said plurality of feed modules such that movement by one of said plurality of linear actuators pivots a corresponding pivot arm from a disengaged position to an engaged position such that a corresponding said first feed wheel and corresponding said second feed wheel are in sufficient proximity to drive a wire therebetween.

13. The wire feeding apparatus according to claim 12, further comprising a control system connected to said servo motor and said plurality of linear actuators, and wherein said control system engages at least one of said plurality of linear actuators prior to engagement of said servo motor.

14. The wire feeding apparatus according to claim 12, wherein each of said plurality of linear actuators is an air cylinder.

15. The wire feeding apparatus according to claim 12, further comprising at least one wire guide operatively connected to each of said plurality of feed modules.

16. The wire feeding apparatus according to claim 12, further comprising a gearbox intermediate said servo motor and said drive shaft.

17. The wire feeding apparatus according to claim 12, further comprising a plurality of spur gears connected to said drive shaft and each of said plurality of spur gears is in driving connection with a corresponding fixed gear of said plurality of feed modules.

18. The wire feeding apparatus according to claim 12, wherein said first feed wheel and said second feed wheel are black oxide coated.

19. The wire feeding apparatus according to claim 12, wherein said first feed wheel and said second feed each include at least one groove adapted to receive the wire.

20. The wire feeding apparatus according to claim 19, wherein said groove is dimensioned according to a size of the wire.

21. A method of controlling a wire feeding apparatus, the method comprising the steps of:
   a. providing a fixed gear connected to a first feed wheel and a pivotable gear connected to a second feed wheel, said pivotable gear mounted such that an axis of rotation of said pivotable gear is pivotally movable along an arcuate path toward and away from said fixed gear;
   b. providing a pivot arm connected to said pivotable gear and a linear actuator connected to said pivot arm;
   c. engaging said linear actuator;
   d. pivotally moving said pivotable gear along an arcuate path toward said fixed gear;
   e. frictionally engaging a wire with said first feed wheel and said second feed wheel;
   f. engaging a servo motor; and
   g. rotating a drive shaft connected to said fixed gear.

22. The method according to claim 21, further comprising the step of selecting at least one other linear actuator for engagement.

* * * * *